(12) United States Patent
Koga

(10) Patent No.: US 6,388,757 B1
(45) Date of Patent: *May 14, 2002

(54) PRINTING APPARATUS, PRINTING SYSTEM, AND A METHOD FOR ACQUIRING CHARACTER RESOURCES OF THE PRINTING SYSTEM

(75) Inventor: Hiroshi Koga, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/017,330

(22) Filed: Feb. 2, 1998

Related U.S. Application Data

(63) Continuation of application No. 08/443,572, filed on May 17, 1995, now abandoned.

(30) Foreign Application Priority Data

| May 20, 1994 | (JP) | 6-106739 |
| May 20, 1994 | (JP) | 6-106739 |
| Oct. 27, 1994 | (JP) | 6-263027 |
| Oct. 27, 1994 | (JP) | 6-263027 |

(51) Int. Cl.$^7$ .............................. G06F 15/00; G06K 1/00
(52) U.S. Cl. ........................ 358/1.11; 358/1.2; 358/1.1; 358/1.13; 358/1.15; 358/1.16
(58) Field of Search .................... 707/524; 364/943.43, 364/943.44; 395/102, 109, 110, 1.11; 400/615.2, 83; 358/1.2, 1.9, 1.11, 1.12, 1.14, 1.15, 1.16

(56) References Cited

U.S. PATENT DOCUMENTS

| 5,142,613 A | * | 8/1992 | Morikawa et al. | 395/110 |
| 5,206,736 A | * | 4/1993 | Simpson | 358/296 |
| 5,297,246 A | * | 3/1994 | Horiuchi et al. | 358/1.11 |
| 5,359,708 A | * | 10/1994 | Bloomer | 364/943 |
| 5,595,450 A | * | 1/1997 | Beadman | 400/615.2 |

FOREIGN PATENT DOCUMENTS

| EP | 0 575 172 A1 | * | 6/1993 | G06F/3/12 |
| EP | 0575172 | | 12/1993 | G06F/3/12 |

* cited by examiner

*Primary Examiner*—Edward Coles
*Assistant Examiner*—Twyler Lamb
(74) *Attorney, Agent, or Firm*—Fitzpatrick, Cella, Harper & Scinto

(57) ABSTRACT

An information processing apparatus to be connected to a printing apparatus includes an acquisition device for acquiring font information of the printing apparatus from the printing apparatus, a determination device for determining a disposing position of characters of a document to be printed on the printing apparatus by using the font information acquired by the acquisition device, and a display for displaying the characters of the document to be printed by the printing apparatus on the display based on the disposing position determined by the determination device.

16 Claims, 10 Drawing Sheets

PRINTING APPARATUS, PRINTING SYSTEM, AND A METHOD FOR ACQUIRING CHARACTER RESOURCES OF THE PRINTING SYSTEM

This application is a continuation of Ser. No. 08/443,572, filed May 17, 1995 now ABN.

BACKGROUND OF THE INVENTION

1. Field of the Invention

This invention relates to a printing apparatus and a printing system for performing printing on a recording medium by analyzing input character information, and a method for acquiring character resources of the printing system.

2. Description of the Related Art

In order to print characters according to a conventional printing control method for a printing apparatus (printer) or a printing system, when intending to perform printing utilizing a printer font mounted in the printer, it is necessary to prepare various kinds of information relating to characters mounted in the printer within a printing control program (printer driver) provided in a program memory of an external CPU (central processing unit) or a host system for realizing the printing control method, and the printer driver causes the printer to print characters based on the information.

Conventionally, part of the information relating to characters, such as character pitches and the like, can be acquired from a printer only by serial interface communication, such as RS-232C or the like. For example, there is a method of acquiring the pitches of characters by transmitting the code of each character of the currently selected typeface.

In conventional printing apparatuses or printing systems, various kinds of information relating to characters mounted in a printer for printing characters are provided within a printing control program (printer driver) for controlling printing by the printer.

Although part of the information, such as character pitches and the like, can be acquired, information can be acquired only by some limited communication methods, such as serial interface communication conforming to RS-232C, and the like, and the following problems (1)–(3) arise.

(1) Since information relating to all characters mounted in a printer must be prepared within a printing control program (printer driver), if the number and the kind of characters mounted in each printer having the same control processing system differ, information relating to all such characters must be prepared. As a result, the capacity of a memory occupied by the data region for that information for operating the printer driver greatly increases.

(2) When acquiring partial information, such as character pitches of a printer font and the like, from a printer, information for each character can be acquired. However, such information is insufficient for forming a document with a large number of characters by performing processing of controlling a printing form in a printer driver, and is therefore insufficient for printing characters. Furthermore, the processing speed is reduced.

(3) Communication with a host printer when acquiring partial information, such as character pitches of a printer font, and the like, from a printer can be realized only by some limited communication methods, such as serial interface communication conforming to RS-232C, and the like. Accordingly, such information cannot be acquired in a system adopting parallel interface hardware conforming to Centronix or the like, which is generally used in a connection method between a printer and a host system.

In accordance with recent progress in the processing capability of a computer system, it has been requested that an output on a display of a host system coincide with an output by a printer.

For example, it is requested that an image or characters seen by the user on a display of a host system can be output by a printer without being modified, and the user can preview the result of printing on the display (desirably with unit magnification) (so-called WYSIWYG (What You See is What You Get).

For that purpose, at least in the case of outputting characters, the same font must be used on the display of the host system and by the printer.

Accordingly, in conventional computer systems, the following methods are used when realizing coincidence between a display output of characters on a display and a result of printing by a printer.

(1) In one method, instead of transmitting character codes to the printer, the host system develops a character typeface (font) or a font for display, which is mounted therein, in the form of a pattern image, and transmits the developed image as a bit-map image. The transmitted bit-map image is then printed.

(2) In another method, the host system develops a font or a font for display, which is mounted therein, in the form of a bit-map image (or pattern data for rasterizing a bit-map image), and transmits the bit-map image to the printer (to be loaded therein). When performing printing, character codes are transmitted to the printer, which prints a bit-map image having the corresponding font.

(3) In still another method, the same font as that mounted in the host system is mounted in advance in the printer, and the same font is output both on the display and by the printer.

In the above-described conventional approaches, however, when it is intended to realize coincidence between a character output on the display and a result of character printing by the printer, the following problems are present.

(1) In the method in which a font is developed in the form of a pattern image in the host system, the pattern image is transmitted to the printer as a bit-map image, and the printer prints the bit-map image, much time is needed from the start of printing until the end of the printing in which paper is discharged because the amount of data transfer between the host system and the printer is great.

(2) In the method in which a font mounted in the host system is developed in advance in the form of a bit-map image, the bit-map image is transmitted to the printer (to be loaded therein), and when printing, character codes are transmitted to the printer, and the loaded bit-map image (or pattern data) is printed, the printer side must have a storage device having a large storage capacity, such as a memory or a hard-disk device, thereby increasing the cost of the printer. Particularly, in order be able to select a font used for printing, bit-map images of a plurality of fonts must be stored, so that the storage device of the printer must have a larger capacity.

(3) In the method in which the same font is mounted in the host system and in the printer, compatibility between the host system and the printer is a problem. For example, a font mounted in the host system is in most cases supplied in the form of software, so that the user can arbitrarily exchange or add a font. On the other hand, the printer must supply a font by storing it in a storage device, such as a ROM (read-only memory) or the like. Accordingly, it is difficult to maintain compatibility of a font between the host system and the printer.

SUMMARY OF THE INVENTION

The present invention has been made in consideration of the above-described problems.

It is an object of the present invention to provide a printing apparatus which can supply character-resource information of the printing apparatus, which originally must be stored in a printing control mechanism of an external apparatus, to the external apparatus whenever necessary in response to a request from the external apparatus while reducing the storage capacity of the information at the printing apparatus.

It is another object of the present invention to provide a printing system in which a printing apparatus and an external apparatus can communicate with each other via a predetermined two-way interface, and which can supply character-resource information of the printing apparatus, which originally must be stored in a printing control mechanism of the external apparatus, to the external apparatus whenever necessary by communication between the printing apparatus and the external apparatus in response to a request from the external apparatus while reducing the storage capacity of the information at the printing apparatus.

It is still another object of the present invention to provide a printing system in which each printing apparatus and each external apparatus can communicate with each other via a predetermined network, and which can supply character-resource information of each printing apparatus, which originally must be stored in a printing control mechanism of each external apparatus, to the each external apparatus whenever necessary by communication between the each printing apparatus and the each external apparatus in response to a request from the each external apparatus while reducing the storage capacity of the information of each printing apparatus.

It is yet another object of the present invention to provide a character-resource acquisition method of a printing system in which a printing apparatus and an external apparatus can communicate with each other via a predetermined two-way interface, and which can transfer character-resource information of the printing apparatus, which originally must be stored in a printing control mechanism of the external apparatus, to the external apparatus whenever necessary by communication between the printing apparatus and the external apparatus in response to a request from the external apparatus while reducing the storage capacity of the information at the printing apparatus.

It is yet a further object of the present invention to provide a printing system in which in character-information processing in a host system, when, for example, realizing coincidence between a character display on a display and a result of character printing by a printing apparatus, high-speed processing can be performed with a low cost by reducing a memory capacity necessary for both the host system and the printing apparatus, and compatibility between the host system and the printing apparatus can be easily maintained.

According to a first aspect, the present invention, which achieves these objectives, relates to a printing apparatus comprising storage means for storing character-resource information including the name of a typeface of printable characters, the height/width of each character, the position of a base line, and character-qualification setting parameters, and transfer means for transferring all the character-resource information stored in the storage means to an external apparatus at a time based on a character-resource acquisition request input from the external apparatus via a predetermined interface.

In a second aspect of the present invention, the storage means is detachable relative to a main body of the printing apparatus.

According to a third aspect, the present invention relates to a printing system comprising storage means for storing character-resource information including the name of a typeface of printable characters, the height/width of each character, the position of a base line, and character-qualification setting parameters, printing control means for controlling a printing operation of a printer engine on a recording medium by analyzing a series of output control commands received from an external apparatus via a two-way interface, first communication control means for transferring a request to acquire character-resource information of all characters stored in the storage means to a printing apparatus, and second communication control means for transferring the character-resource information of all the characters stored in the storage means to the external apparatus at a time via the two-way interface in response to the request to acquire the character-resource information by the first communication control means.

In a fourth aspect of the present invention, the printing system further comprises resource storage means for storing the character-resource information transferred at a time by the second communication control means, analysis means for analyzing input character information and printing parameters, determination means for determining a printing form for the input character information based on a result of the analysis of the analysis means and the character-resource information stored in the storage means, conversion means for converting the data into a series of output control commands based on the printing form determined by the determination means, and third communication control means for transferring the series of output control commands converted by the conversion means to the printing apparatus via a predetermined two-way interface.

In a fifth aspect of the present invention, the first communication means transfers the request to acquire the character-resource information of all the characters stored in the, storage means to the printing apparatus at an initializing setting of the printing apparatus.

In a sixth aspect of the present invention, the resource storage means stores character-resource information of a plurality of printing apparatuses.

According to a seventh aspect, the present invention relates to a printing system comprising storage means for storing character-resource information including the name of a typeface of printable characters, the height/width of each character, the position of a base line, and character-qualification setting parameters, printing control means for controlling a printing operation of a printer engine on a recording medium by analyzing a series of output control commands received from an external apparatus via a predetermined network, first communication control means for transferring a request to acquire character-resource information of all characters stored in the storage means of each printing apparatus to the each printing apparatus, and second communication control means for transferring the character-resource information of all the characters stored in the storage means of the each printing apparatus to the external apparatus at a time via the predetermined network in response to the request to acquire the character-resource information by the first communication control means.

In an eighth aspect of the present invention, the printing system further comprises resource storage means for storing the character-resource information transferred at a time by the second communication control means, analysis means for analyzing input character information and printing parameters, determination means for determining a printing form for the input character information based on a result of the analysis of the analysis means and the character-resource information stored in the storage means, conversion means for converting the data into a series of output control commands based on the printing form.determined by the determination means, and third communication control means for transferring the series of output control commands converted by the conversion means to the printing apparatus via a predetermined network.

In a ninth aspect of the present invention, the first communication means transfers the request to acquire all the character-resource information stored in the storage means to each printing apparatus at an initializing setting of each printing apparatus.

According to a tenth aspect, the present invention relates to a character-resource acquisition method of a printing system comprising storage means for storing character-resource information including the name of a typeface of printable characters, the height/width of each character, the position of a base line, and character-qualification setting parameters, printing control means for controlling a printing operation of a printer engine on a recording medium by analyzing a series of output control commands received from an external apparatus via a two-way interface, comprising the steps of transferring a request to acquire character-resource information of all characters stored in the storage means to a printing apparatus, and transferring the character-resource information of all the characters stored in the storage means to an external apparatus at a time via the two-way interface in response to the request to acquire the character-resource information.

According to an eleventh aspect, the present invention relates to a printing system configured by a host system and a printing apparatus in which the same character typeface is used both in character information processing in the host system and in printing processing in the printing apparatus, comprising two-way communication means for transmitting and receiving information in two ways between the host system and the printing apparatus, and control means for loading character-resource information and character-pattern information mounted in the printing apparatus from the printing apparatus into the host system via the two-way communication means, so that characters mounted in the printing apparatus are used both in character-information processing in the host system and in printing processing in the printing apparatus.

In the first aspect of the present invention, all character-resource information stored in the storage means is transferred to the external apparatus at a time based on a request to acquire character resources input from the external apparatus via the predetermined interface, and character information input to the external apparatus is processed in accordance with peculiar character-resource information acquired from the printing apparatus which intends to perform printing.

In the second aspect of the present invention, all character-resource information stored in the storage means, which is detachable relative to the main body of the printing apparatus, is transferred to the external apparatus at a time based on a request to acquire character resources input from the external apparatus via the predetermined interface, and character information input to the external apparatus is processed in accordance with peculiar character-resource information acquired from the printing apparatus which intends to perform printing.

In the third aspect of the present invention, when a request to acquire character-resource information of all characters stored in the storage means of the printing apparatus is issued from the external apparatus, the printing apparatus transfers all the character-resource information to the external apparatus via the predetermined two-way interface, and processing of printing character information input to the external apparatus by the printing apparatus in an excellent state is performed by acquiring the character-resource information of the printing apparatus, intending to perform printing, which originally must be stored in the external apparatus.

In the fourth aspect of the present invention, character-resource information transmitted from the printing apparatus at a time is stored, input character information and printing parameters are analyzed by the analysis means, a printing form for the input character information is determined based on a result of the analysis and the stored character-resource information, the data is converted into a series of output control commands based on the determined printing form, and the series of converted output control commands are transferred to the printing apparatus via the predetermined two-way interface, so that the output commands for obtaining an excellent result of printing from the character-resource information acquired from the printing apparatus and the input character information are efficiently transferred to the printing apparatus.

In the fifth aspect of the present invent-ion, when a request to acquire character-resource information of all characters stored in the storage means of the printing apparatus is issued from the external apparatus at initializing setting of the printing apparatus, all the character-resource information is transferred from the printing apparatus to the external apparatus at a time via the predetermined two-way interface, and processing of printing character information input to the external apparatus by the printing apparatus in an excellent state is performed by acquiring the character-resource information of the printing apparatus, intending to perform printing, which originally must be stored in the external apparatus.

In the sixth aspect of the present invention, character-resource information transferred from the plurality of printing apparatuses at a time is stored, input character information and printing parameters are analyzed by the analysis means, a printing form for the input character information is determined based on a result of the analysis and one of the stored character-resource information, the data converted into a series of output control commands based on the determined printing form, and the series of converted output control commands are transferred to the printing apparatus via the predetermined two-way interface, so that the output commands for obtaining an excellent result of printing from the character-resource information acquired from the printing apparatus and the input character information are efficiently transferred to the printing apparatus.

In the seventh aspect of the present invention, all character-resource information stored in the storage means is transferred to the external apparatus at a time in response to a request to acquire character resources input from the external apparatus via the predetermined network, and character information input to the external apparatus is processed in accordance with peculiar character-resource information acquired from each printing apparatus.

In the eighth aspect of the present invention, all character-resource information stored in the storage means, which is detachable relative to the main body of the printing apparatus, is transferred to the external apparatus at a time based on a request to acquire character resources input from the external apparatus via the predetermined network, and character information input to the external apparatus is processed in accordance with peculiar character-resource information acquired from the printing apparatus intending to perform printing.

In the ninth aspect of the present invention, when a request to acquire all character-resource information stored in the storage means of the printing apparatus has been issued from the external apparatus at initializing setting of the printing apparatus, all the character-resource information is transferred from the printing apparatus to the external apparatus at a time via the predetermined network, and processing for printing character information input to the external apparatus by the printing apparatus in an excellent state is performed by acquiring the character-resource information of the printing apparatus, intending to perform printing, which originally must be stored in the external apparatus.

In the tenth aspect of the present invention, when a request to acquire character-resource information of all characters stored in the storage means of each printing apparatus is issued from the external apparatus at initializing setting of each printer, all the character-resource information is transferred from the each printing apparatus to the external apparatus via the predetermined network, and processing for printing character information input to the external apparatus by the each printer in an excellent state is performed by acquiring the character-resource information of the printing apparatus, intending to perform printing, which originally must be stored in the external apparatus.

In the eleventh aspect of the present invention, character-resource information and character-pattern-configuration data relating to characters mounted in the printing apparatus are loaded from the printing apparatus to the host system via the two-way communication means for transmitting and receiving information in two directions between the host system and the printing apparatus, and characters mounted in the printing apparatus are used both in character-information processing in the host system and in printing processing in the printing apparatus, so that coincidence between character-information processing of the host system, such as processing for displaying characters on a display, and the result of printing by the printing apparatus is easily realized.

DESCRIPTION OF THE PREFERRED EMBODIMENTS

A detailed description will now be provided of a case in which according to a printing control program (printer driver) stored in a program memory of a host system connected to a printer, various kinds of character information (font-matrix information) of all characters mounted in the printer are acquired from the printer at a time in accordance with dedicated two-way-communication protocol control processing procedures (to be described later) using existing parallel-interface hardware conforming to Centronix, and characters are printed by controlling the printer based on the acquired information.

First Embodiment

Figure 1:
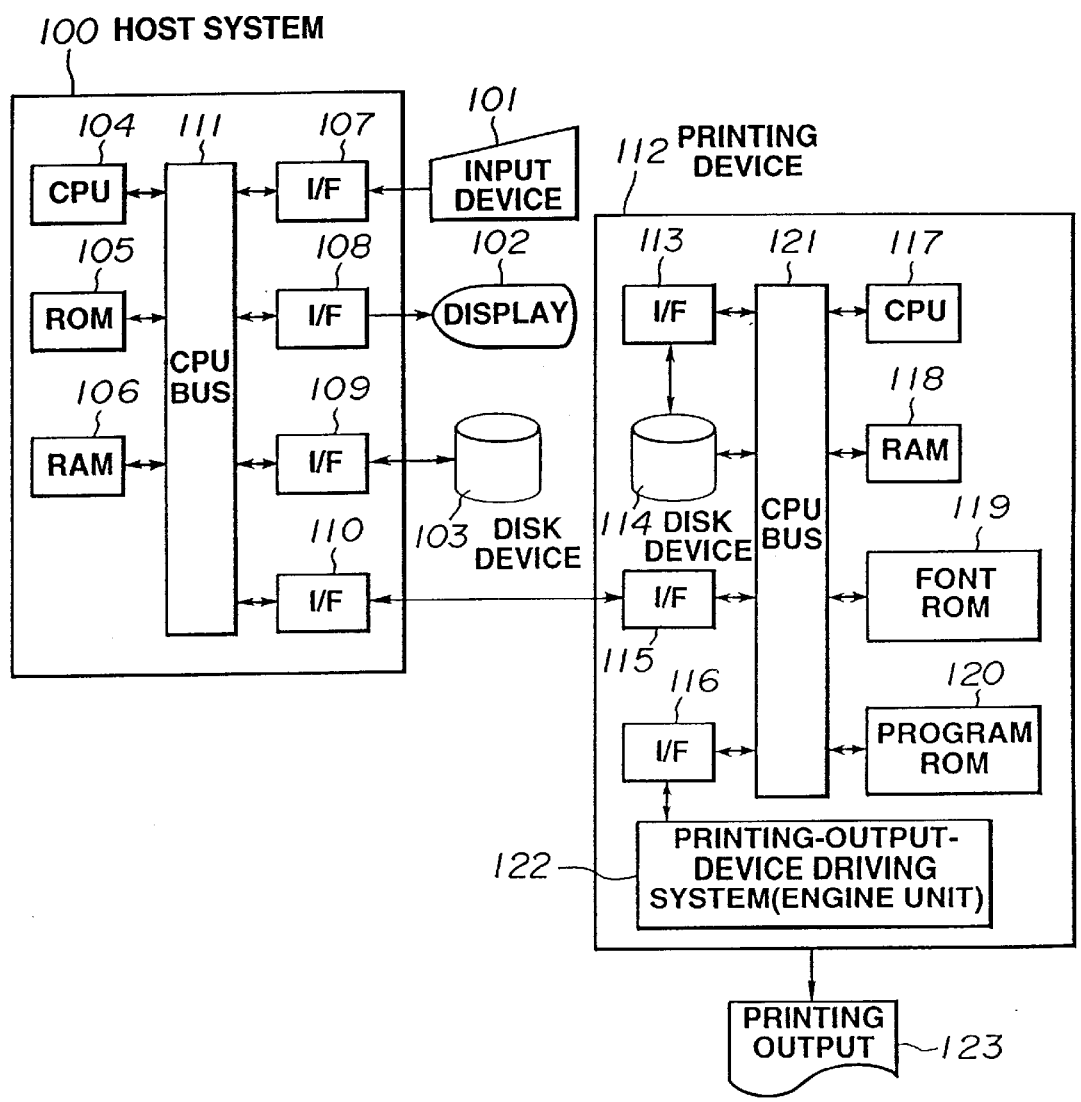
FIG. 1 is a block diagram illustrating the configuration of a printing system according to a first embodiment of the present invention.

FIG. 1 is a block diagram illustrating the configuration of a printing system according to a first embodiment of the present invention. The printing system comprises mainly a printing apparatus (printer) 112, and a host system 100, serving as an external apparatus.

Figure 3:
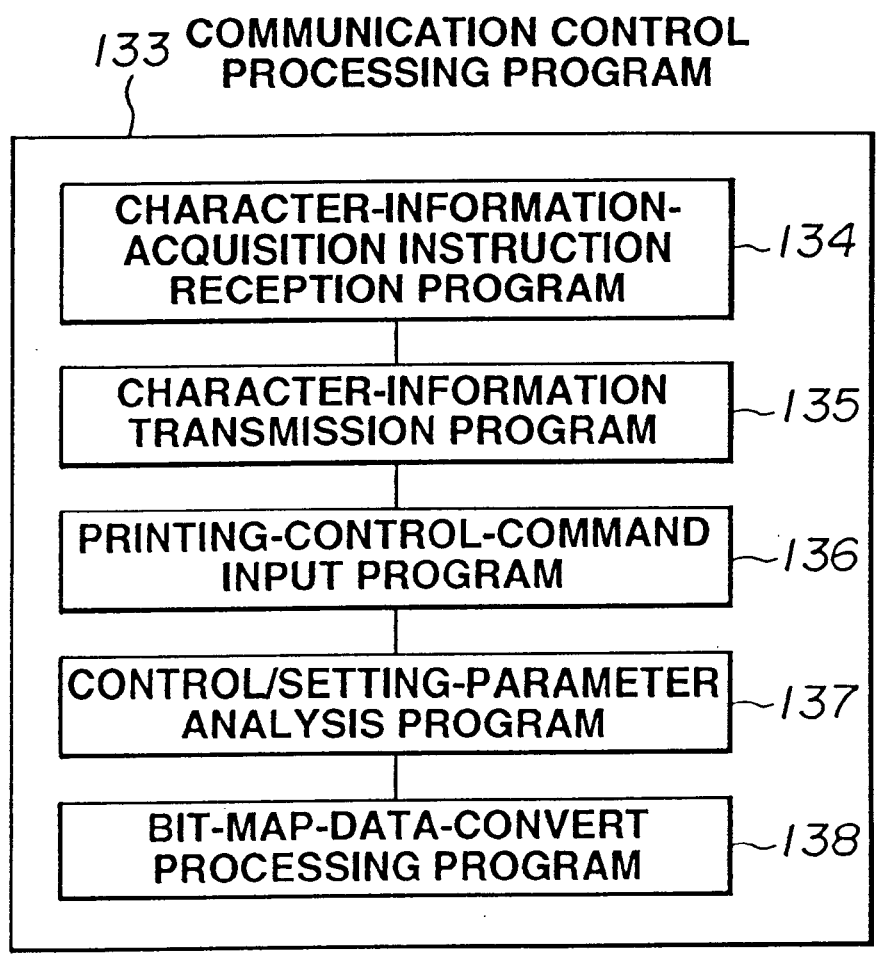
FIG. 3 is a diagram illustrating the configuration of programs stored in a RAM of a printer shown in FIG. 1.

In the printing system comprising the host system 100, an input device 101, comprising a keyboard, a mouse and the like, for inputting data to the host system 100, a display output device (display) 102, comprising a CRT (cathode-ray tube), a liquid-crystal display or the like, for performing display, a disk device 103 (comprising hard disks, floppy disks, MO (magnetooptical) disks or the like) for performing input/output of files, and the printer 112 connected to the host system 100, characters are printed according to a printing control program 124 for controlling printing of the printer 112, which realizes the character printing system of the present invention, stored in a program memory (RAM) 106 within the host system 100, and a program 133 for performing dedicated two-way communication control processing and transmitting font-metrics information, which also realizes the present invention, stored in a program memory (ROM) 120 within the printer 112 (see FIG. 3).

The printer of the printing system includes means for receiving input notification from the printing control program (printer driver), for controlling printing of the printer, stored in an external CPU or in the program memory of the host system for acquiring various kinds of information relating to all characters mounted in the printer at a time according to dedicated two-way communication control processing, dedicated two-way communication control means for outputting the information to the external CPU or the host system which has instructed acquisition of the information, means for transmitting output, and means for printing characters based on information relating to character printing input from the printing control program (printer driver) stored in the external CPU or the program memory of the host system.

The printing control program (printer driver) includes means for initializing the printer in response to an instruction from the external CPU or the program memory of the host system, means for transmitting instruction output notification for acquiring various kinds of information relating to all characters mounted in the printer at a time to the printer via dedicated two-way communication control means, means for receiving the information subjected to output notification by the two-way communication control means, input means for inputting an instruction to input character information for printing from the outside, means for analyzing the input information and parameters, printing control means for determining a printing form, such as the kind of characters, the size of each character, the position to start printing, and the like, based on input character information acquired from the printer, means for converting data into control commands for printing by the printer based on the determined printing form, and means for transmitting the control commands for configuring characters to the printer.

As described above, in the character printing system of the present embodiment, dedicated two-way communication control means is provided between the printer and the printer driver. The printer driver acquires font-metrics information of characters mounted in the printer, and controls printing based on the information, so that the printer prints characters.

The printer control program (printer driver) stored in the external CPU or in the program memory of the host system controls a printing form of characters by acquiring various kinds of information (font-metrics information), such as the typeface name of all characters mounted in the printer, the height/width (pitch) of each character, the position of a base line, qualification setting parameters for emphasis (thick characters), the angle of an oblique typeface, other attribute information, and the like, from the printer using dedicated two-way communication control means, so that the printer prints characters.

A description will now be provided of the configuration of the host system 100 of the printing system.

In the host system 100, a CPU 104 controls the host system and respective input/output devices connected thereto, and executes a series of processing, such as printing control and the like, in response to input instructions, as well as various kinds of programs. A ROM 105 serves as a memory for storing various kinds of basic programs, such as an operating system for operating the CPU 104, which controls the host system and respective input/output devices connected thereto, performs a series of processing, such as printing control and the like, in response to input instructions and executes various kinds of programs, and the like. The RAM 106 serves as a memory used as operating regions for various kinds of processing for execution of the printing control program (printer driver) 124 (see FIG. 2), a display driver and a two-way communication control program by the CPU 104. The RAM 106 also incorporates an application program for inputting information relating to printing and instructing printing to the printer driver 124 and the printer 112 from the outside, and the like. Reference numerals 107 through 109 represent input/output interfaces for the input device 101, such as the keyboard, the mouse and the like, the display 102 and the disk device 103 connected to the host system 100, respectively. An input/output interface 110 includes a dedicated two-way communication protocol using existing parallel-interface hardware, conforming, for example, to Centronix, for performing communication by connecting the host system 100 to the printer 112. A CPU bus 111 connects the respective components of the host system 100 to each other.

The configuration of the printer 112 will now be described in detail.

In the printer 112, a CPU 117 controls respective inputs/outputs connected to the printer 112, and executes programs of a series of processing, such as printing control and the like, communication control processing and the like in response to input instructions. A RAM 118 serves as a memory used as operation regions for execution and processing of various kinds of programs by the CPU 117. A font ROM 119 serves as a memory for storing font-matrix information (such as the typeface name of characters, the height/width (pitch) of each character, the position of a base line, qualification setting parameters of emphasis (thick characters)/the angle of an oblique typeface, other attribute information and the like), data of the configuration of character patterns, and the like. A program ROM 120 serves as a memory for storing programs for controlling respective inputs/outputs, for performing a series of processing, such as printing control and the like, performed in response to input instructions, communication control processing and the like, and for operating the printer 112, such as control-command analysis processing and the like. Reference numeral 113 represents an input/output interface with the disk device 114 which stores font-metrics information, data of the configuration of character patterns, and the like. An input/output interface 115 includes a dedicated two-way communication protocol using existing parallel-interface hardware conforming, for example, to Centronix, for performing exchange of data and communication by connecting the printer 112 to the host system 100. An input/output interface 116 exchanges data and signals with a printing-device driving system (engine unit) 122, such as a laser-beam printer or the like, for performing printing mechanically. A CPU bus 121 connects the respective components of the printer 112 to each other.

Figure 2:
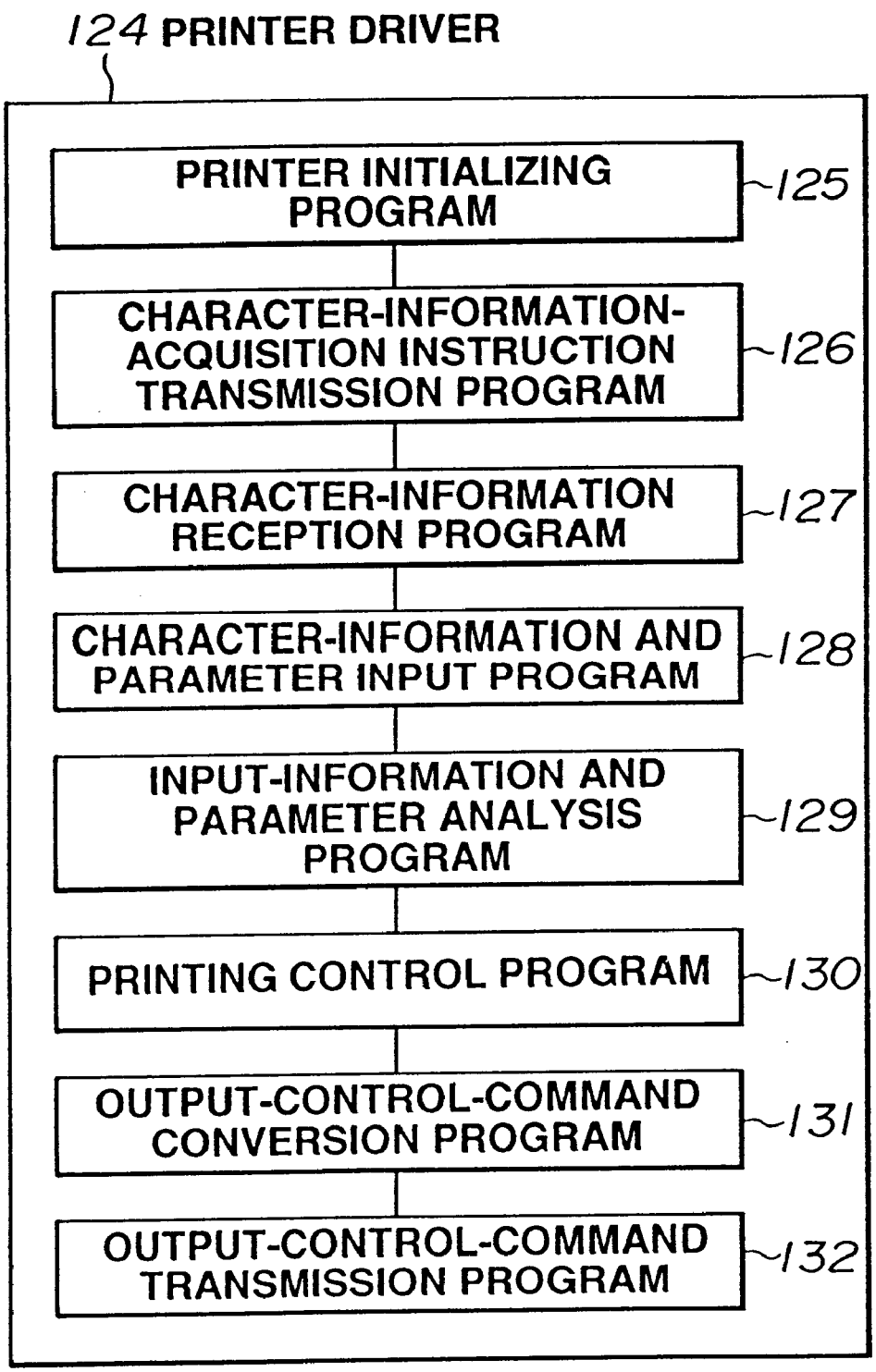
FIG. 2 is a diagram illustrating the configuration of programs stored in a RAM (random access memory) of a host system shown in FIG. 1.

The control processing and the operations of the printer control program (printer driver) 124 within the host system 100 will now be described in detail (see FIG. 2).

The printing control program (printer driver) 124 for realizing the printing system of the present invention stored in the RAM 106 within the host system 100 is started by a character-printing instruction from a document input program of a word processor or the like stored in the RAM 106. First, a control command for initializing the printer in order to control printing of the printer using a printer initializing program 125 is transmitted.

Thereafter, in order to prepare for printing of characters, an instruction to acquire font-metrics information of all characters mounted in the printer 112, or the font-metrics information and character-pattern-configuration data is transmitted to the printer 112 by performing dedicated two-way communication protocol control processing using a character-information-acquisition instruction transmission program 126. This acquisition instruction may be transmitted in the form of a printer control command or in the form of a control signal. The character-pattern-configuration data is control data described in a predetermined form in order to develop (rasterize) a bit image of a font, and has in general a smaller quantity of information than the bit image.

The font-metrics information, or the font-metrics information and the character-pattern-configuration data are received at a time by performing the two-way communication protocol control processing from the printer 112 using a character-information reception program 127, and the received data are stored in a storage control device.

The RAM 106 also stores a character-information and parameter input program 128 for performing input processing of the kind of characters, the printing attribute, the position to start printing, and information relating to respective setting parameters from a document input application program of a word processor or the like stored in the RAM 106 in order to perform printing, an input-information and parameter analysis program 129 for analyzing the input information relating to characters, various kinds of instruction parameters for performing printing, and the like, a printing control program 130 for determining printing of characters and a document configured by the characters based on the respective setting parameters indicating the kind of characters, the printing attribute, a printing form, and the like, and the font-metrics information acquired from the printer 112, an output-control-command conversion program 131 for converting/generating printing control commands for the printer 112 in order to print the determined characters and document, and an output-control-command transmission program 132 for transmitting the generated printing control commands. A series of processing is performed in accordance with these programs, so that the characters and the document are printed by the printer 112.

Printing control within the printing apparatus (printer) 112, and the control processing and operations of the communication control processing program 133 will now be described in detail (see FIG. 3).

In the communication control processing program 133, a character-information-acquisition instruction reception program 134 receives an instruction to acquire font-metrics information transmitted from the printing control program (printer driver) 124 within the host system 100 by peforming dedicated two-way communication protocol control processing.

A character-information transmission program 135 reads font-metrics information of all characters mounted in the printer 112 from the font ROM 119 or the disk device 114 by performing the two-way communication protocol control processing, and transmits the read information to the printer driver 124 at a time.

A printing-control-command input program 136 inputs a printing control command transmitted from the printer driver 124 in order to performing printing by the printer 112.

A control setting parameter analysis program 137 analyzes the input printing control command and respective setting parameters.

A bit-map-development processing program 138 develops character patterns in a bit-map memory based on the printing control command and the setting parameters.

A series of processing is performed by these programs and the generated bit-map data is transmitted to the printing-device driving system (engine unit) 122 via the interface 116, so that printing output 123 of the characters and document is performed.

Next, the printing control program (printer driver) 124 stored in the program memory of the host system 100, communication control processing stored in the program ROM 120 within the printing apparatus (printer) 112, and control processing of the communication control processing program 133 for controlling printing of the printer will be described in detail with reference to the flowcharts shown in FIGS. 4 and 5. A description will be provided of the correspondence between respective units of the present embodiment and respective means of the first through sixth aspects of the present invention, and the functions of the respective means.

In the first aspect of the present invention, in the printing apparatus 112, character-resource-information transfer means (the CPU 117 executing the character-information-acquisition instruction reception program 134 and the character-information transmission program 135 in the present embodiment) transfers all character-resource information stored in storage means (the font ROM 119) to the external apparatus at a time in response to a request to acquire character-resource information input from the external apparatus via the predetermined interface, and character information input to the external apparatus is processed in accordance with peculiar character-resource information acquired from the printing apparatus intending to perform printing.

In the second aspect of the present invention, in the printing apparatus 112, all character-resource information stored in storage means (a font card (not shown)), which is detachable from the main body of the printing apparatus, is transferred to the external apparatus at a time in response to a request to acquire character resources input from the external apparatus via the predetermined interface, and character information input to the external apparatus is processed in accordance with peculiar character-resource information acquired from the printing apparatus intending to perform printing.

The third through sixth aspects of the present invention relate to the printing system comprising the host system 100 and the printing apparatus 112. In the third aspect, when a request to acquire character-resource information of all characters stored in the storage means of the printing apparatus is issued from the external apparatus (the host system 100), all character-resource information is transferred from the printing apparatus 112 to the host system 100 via a predetermined two-way interface (such as a Centronix interface or the like), and processing of printing character information input to the host system 100 by the printing apparatus in an excellent state is performed by acquiring the character-resource information of the printing apparatus 112, intending to perform printing, which originally must be stored in the host system 100.

In the fourth aspect, character-resource information transferred from the printing apparatus 112 at a time is stored in the resource storage means, such as the disk device 103 or the like, and the analysis means (the input-information and parameter analysis program 129 within the printer driver 124 in the present embodiment) analyzes input character information and printing parameters. In the present embodiment, the printing control program 130 within the printer driver 124 determines a printing form of the input character information based on the result of the analysis and the stored character-resource information. In the present embodiment, the output-control-command conversion program 131 within the printer driver 124 converts data into a series of output-control commands based on the determined printing form, and the output-control-command transmission program 132 within the printer driver 124 transfers the series of converted output-control commands to the printing apparatus 112 via the predetermined two-way interface, so that an output command for obtaining an excellent result of printing from the character-resource information acquired from the printing apparatus and input character information is efficiently transferred to the printing apparatus.

In the fifth aspect of the present invention, when a request to acquire character-resource information of all characters stored in the storage means (the font ROM 119) of the printing apparatus is issued from the external apparatus (the host system 100) at initializing setting of the printing apparatus 112, all character-resource information is transferred from the printing apparatus 112 to the host system 100 via the predetermined two-way interface at a time, and processing of printing character information input to the host system 100 by the printing apparatus 112 in an excellent state is performed by acquiring the character-resource information of the printing apparatus 112, intending to perform printing, which originally must be stored in the host system 100.

In the sixth aspect, character-resource information transferred from a plurality of printing apparatus at a time is stored in the disk device 103. The analysis means (the input-information and parameter analysis program 129 within the printer driver 124 in the present embodiment) analyzes input character information and printing parameters. A printing form of the input character information is determined in the above-described manner based on the result of the analysis and one of the stored character-resource information. Data is converted into a series of output-control commands based on the determined printing form. The series of converted output-control commands are transferred to the printing apparatus 112 in the above-desribed manner via the predetermined two-way interface, so that an output command for obtaining an excellent result of printing from the character-resource information acquired from the printing apparatus and input character information is efficiently transferred to the printing apparatus.

Figure 4:
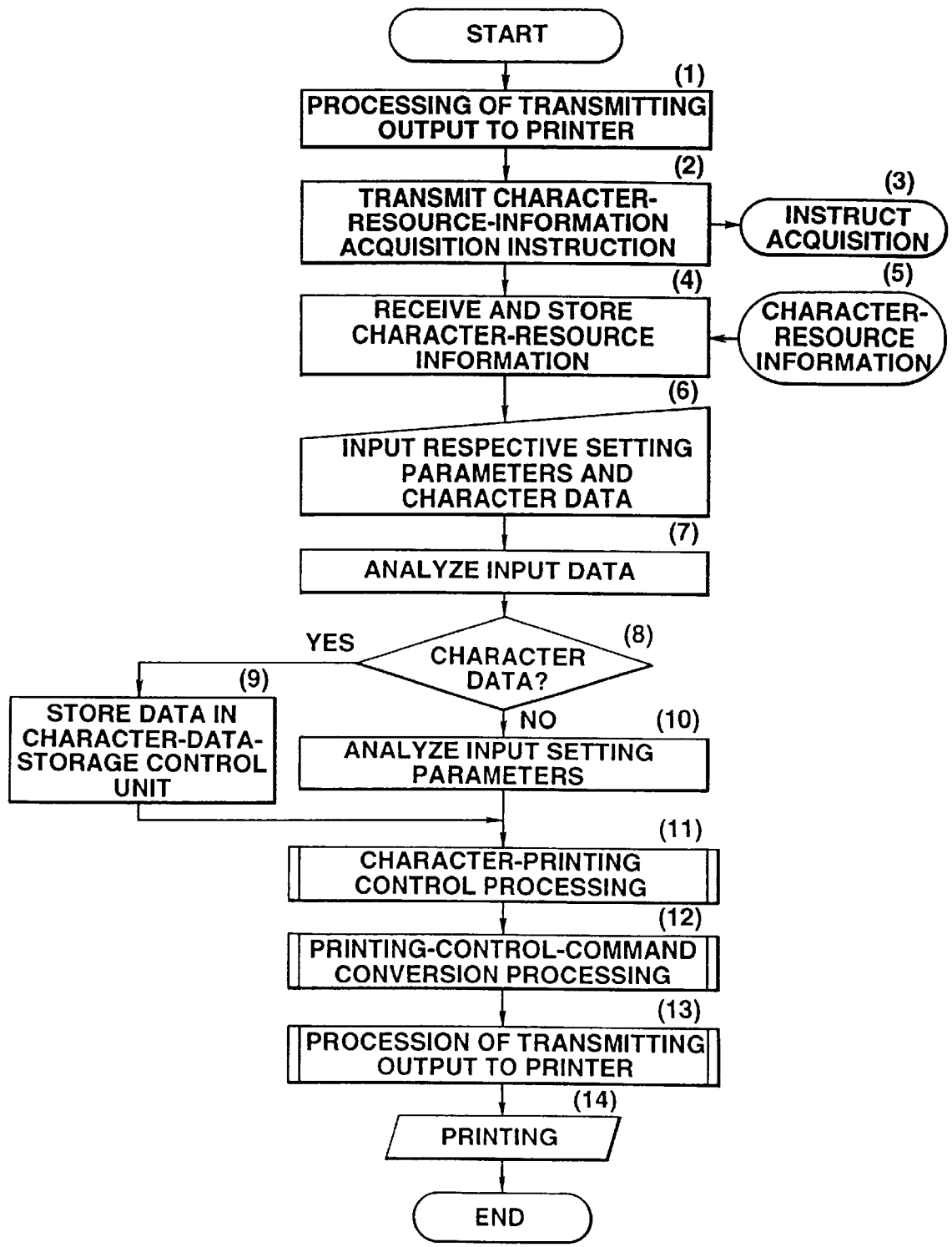
FIG. 4 is a flowchart illustrating a method for acquiring character resources of the printing system in the first embodiment.

FIG. 4 is a flowchart illustrating a method for acquiring character resources of the printing system according to the present embodiment. In FIG. 4, numerals (1)–(14) indicate respective steps. The printing control program (printer driver) 124 for executing the respective steps is started according to an instruction of printing to the printer from the outside, for example, a document-input application program of a word processor or the like.

First, in step (1), in order to provide preparation for printing, such as the size of paper, the direction of printing, setting of a usable typeface of characters, setting of units of the coordinate system, and the like, respective setting parameters for the printer 112 are converted/generated in the form of printer control commands, and the commands are transmitted to perform initializing processing of the printer 112.

In step (2), in order to determine a printing form of characters and to prepare for printing, dedicated two-way communication protocol control processing is performed for the printer 112. In step (3), instruction for acquiring font-metrics information of all characters mounted in the printer 112 at a time is transmitted.

In step (4), the two-way communication protocol control processing is performed from the printer 112. In step (5), the font-metrics information of all characters received at a time is stored in a storage control device, such as the memory 106, the disk device 103 or the like.

In step (6), respective setting parameters for assigning a printing form of characters from the outside and character data for the printing control program 124 are input.

In general, respective setting parameters for assigning a printing form of characters and character data are input from an application program for forming character data via an operating system.

In step (7), processing of analyzing the respective setting parameters and character data, which have been input, and the like is performed.

In step (8), the parameters and data analyzed in step (7) are separated into character data and respective setting parameters.

If it is determined in step (8) that input data is character data, in step (9), the data is stored in a character-data-storage control unit in order to prepare for the subsequent processing.

If it is determined in step (8) that input data is not character data, based on input setting parameter analysis processing in step (10) and font-metrics information of all characters mounted in the printer 112 acquired from the printer 112, in character-printing control processing (module) in step (11), a printing form of characters, comprising selection of the kind of characters, calculation of the size of each character, the position of printing, and the like, is determined and prepared for display and printing on pages of printing paper.

Such control data for characters is converted and generated into printing control commands for the printer in order to perform printing by the printer 112 in printing-control-command conversion processing in step (12).

In processing (module) of transmitting output to the printer in step (13), the printing control commands generated in step (12) are transmitted to the printer 112. In step (14), printing is performed by the printer 112, and the processing is terminated.

Figure 5:
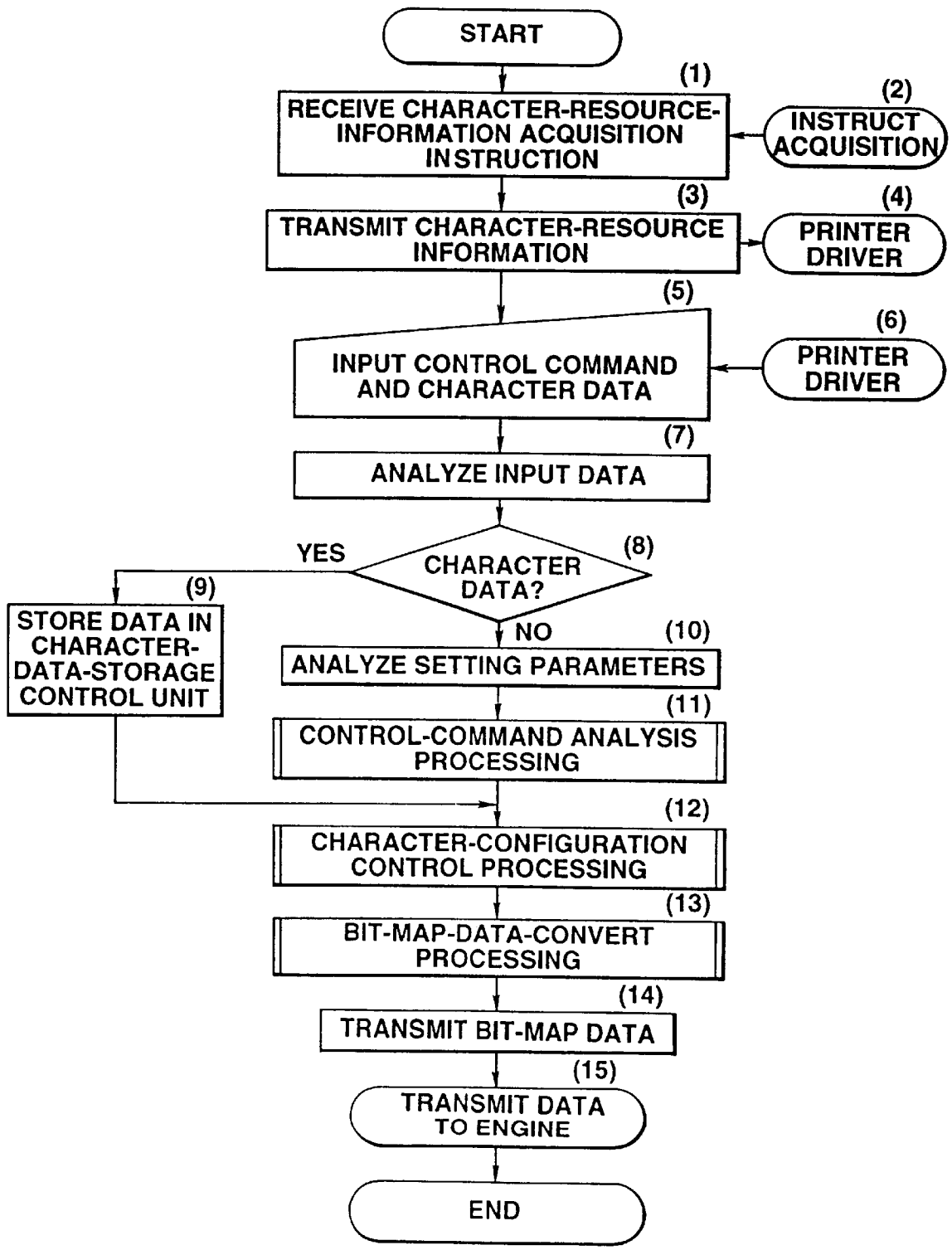
FIG. 5 is a flowchart illustrating another method for acquiring character resources of the printing system in the first embodiment.

FIG. 5 is a flowchart illustrating a method for acquiring character resources of the printing system in the present embodiment, which corresponds to processing in the printing apparatus (printer) 112 of the printing system, and more particularly, to processing according to printing control and communication control processing program 133. In FIG. 5, numerals (1)–(15) represent respective steps. The printing control and communication control program 133 for executing the respective steps is started when the printing control program (the printer driver) 124 transmits a control command in response to printing instruction from a document input application program from the outside, such as a word processor or the like, to the printer driver 124, and the printer 112 receives the control command.

First, in step (1), an instruction to acquire font-metrics information of all characters mounted in the printer 112 from the printer driver 124 in step (2) is received by performing dedicated two-way communication protocol control processing.

In steps (3) and (4), by performing the two-way communication protocol control processing, the font-metrics information of all characters is read from a storage control device, such as the font ROM within the printer 112, or the disk device 114, and the read information is transmitted.

In steps (5) and (6), printing control commands for printing characters and character data are input from the printer driver 124.

In step (7), processing of analyzing the input printing control commands and character data is performed.

In step (8), the printing control commands and character data analyzed in step (7) are separated into character data and setting parameters.

The character data separated in step (8) (branching by determination) is stored in step (9) in the character-data storage control unit, and is prepared for the subsequent processing.

Similarly, the setting parameters separated in step (8) (branching by determination) are analyzed in step (10). In control-command analysis processing (module) in step (11), a printing form of characters, comprising selection of the kind of characters, calculation of the size of each characters, the position of printing, and the like, is determined based on the setting parameters and the printing control commands analyzed in step (10), and control data for printing characters is generated.

The character data stored in the character-data-storage control unit in step (9) and the analyzed control data for printing generated characters determine characters, the configuration pattern and the form of a document, and arrangement of chracters on paper in character-configuration control processing (module) in step (12).

In bit-map development processing (module) in step (13), the characters and the configuration pattern and the form of the document determined in the character-configuration control processing (module) in step (12) are reproduced and generated in the form of bit-map data, and the bit-map data is developed in a page or printing region (band) memory.

In steps (14) and (15), the generated bit-map data is transmitted to the printing-device driving system (engine unit) 122, which prints the characters and the document.

As described above, according to the present embodiment, dedicated two-way communication protocol control processing is provided for performing two-way communication between an external CPU or a host system and a printing apparatus (printer) using existing parallel-interface hardware conforming to Centronix. A printing control program (printer driver) for controlling printing by the printer stored in a program memory of the host system transmits instruction notification for acquiring various kinds of information (font-metrics information) relating to all mounted characters at a time to the printer. The printer which has received the acquisition notification transmits the font-metrics information to the printer driver in the host system. The printer driver which has received and acquired the information performs printing control for determining a printing form, comprising the kind of characters, the size of each character, the position of start of printing, and the like, based on character data and various kinds of setting parameters input from the outside for printing characters and a document, and the font-metrics information acquired from the printer, converts the data into printing control commands for the printer, and transmits the commands to the printer. Thus, it is possible to provide a character printing system for printing characters.

The dedicated two-way communication protocol control processing using a parallel interface in the first embodiment may be replaced by dedicated two-way communication protocol control processing using a conventional serial interface conforming to RS-232C, so that communication control is performed between the printer driver 124 stored in the RAM 106 within the host system and the printer 112 shown in FIG. 1.

The printer driver 124 stored in the RAM 106 within the host system 100 shown in FIG. 1 in the first embodiment may directly access the font ROM 119 or the disk device 114, which stores various kinds of information, such as character-configuration-pattern data, font-metrics information and the like, within the printer 112 by performing dedicated two-way communication protocol control processing, acquire only necessary information, and perform printing control processing of characters, so that characters are printed.

In the present embodiment, a portion relating to dedicated two-way communication protocol control processing may be separated from the printer driver 124 stored in the RAM 106 within the host system 100 shown in FIG. 1, and a program dedicated for this communication control may be provided. This program may be called from the printer driver 124 under various circumstances, and character printing control processing may be peformed by acquiring information necessary for printing control processing in addition to font-metrics information of characters from the printer 112, so that a printing system for performing printing can be provided.

The present embodiment may be applied to a system comprising a plurality of apparatuses, or to an apparatus comprising a single unit. The present embodiment may, of course, be applied to a case in which the object of the invention is achieved by supplying a system or an apparatus with programs.

Although in the above-described embodiment, a description has been provided illustrating a printing system in which a printing apparatus is connected to an external apparatus via a predetermined interface, the present invention may also be applied to a system in which the host system 100 and the printing apparatus 112 shown in FIG. 1 may be connected to each other via a predetermined network (not shown), such as SCSI, Local Talk, Ethernet, At Work, or the like (including trade names). A description will now be provided of the correspondence and the function of each means in the seventh through ninth aspects of the present invention with reference to FIG. 1.

In the seventh aspect of the present invention, all character-resource information stored in the storage means (the font ROM 119) is transferred to each external apparatus (one of host computers (not shown)) at a time in response to a character-resource acquisition request input from the each external apparatus via the predetermined network, and character information input to the each external apparatus is processed in accordance with peculiar character-resource information acquired from each printing apparatus 112 intending to perform printing.

In the eighth aspect of the present invention, all character-resource information stored in storage means (a memory card (not shown)), which is detachable to the main body of the printing apparatus, is transferred to one of external apparatus (one of host computers (not shown)) at a time in response to a character-resource acquisition request input from the external apparatus via the predetermined interface, and character information input to the external apparatus is processed in accordance with peculiar character-resource information acquired from the printing apparatus 112 intending to perform printing.

In the ninth aspect of the present invention, when a request to acquire character-resource information of all characters stored in the storage means (the font ROM 119) of the printing apparatus at initializing setting of the printing apparatus is issued from an external apparatus (one of host computers (not shown)), all the character-resource information is transferred from the printing apparatus 112 to the external apparatus at a time via the predetermined net-work.

In addition, processing of printing character information, input to the external apparatus by the printing apparatus in an excellent state by acquiring the character-resource information of the printing apparatus 112, intending to perform printing, which originally must be stored in the external apparatus, is performed.

In the above-described embodiment, various kinds of information relating to characters mounted in the printer for printing characters are not prepared within a printing control program (printer driver) for controlling printing by the printer. In a parallel interface conforming to Centronix or the like which is generally used in a method of connecting the printer to the host system as well as in a conventional serial interface conforming to RS-232C or the like, the printer driver acquires necessary information from the printer by performing dedicated two-way communication cofntrol processing between the printer and the printer driver while using the existing hardware resource, and printing control is performed based on the acquired information, so that a character printing system for printing characters can be provided.

Character-resource information (font-metrics information (such as the typeface name of all characters, the height/width (pitch) of each character, the position of a base line, qualification setting parameters of emphasis (thick characters)/ the angle of an oblique typeface, other attribute information, and the like) of all characters mounted in the printer is not prepared within the printing control program (printer driver 124). Such information can be acquired even if the number and the kind of mounted characters differ for each printer having the same control processing system. Hence, the capacity of a memory occupied by the data region of the information is greatly reduced or becomes unnecessary for performing a control operation of the printer driver 124, so that the size of the memory in the system can be reduced.

Furthermore, since it becomes possible to acquire all font-metrics information or necessary information from the printer as information for printing characters by performing print-forming control processing in the printer driver and forming a document by a large number of characters, and to acquire font-metrics information at a time, the speed of printing control processing can be increased.

Conventionally, two-way communication control processing is realized between a host system and a printer only by some limited communication methods, such as serial interface communication conforming to RS-232C and the like. However, by providing dedicated two-way communication protocol control processing, the present invention may also be applied to a system using hardware which adopts a parallel interface conforming to Centronix or the like that is generally used in a method of connecting a printer to a host system including an external apparatus.

The transfer of character-resource information shown in the above-described embodiment corresponds to processing when information is transferred between an external apparatus and a printing apparatus via a general-purpose interface. However, information may be tranferred between the external apparatus and the printing apparatus via a network (not shown).

A description will now be provided of the correspondence between each process of the present embodiment and each process in the tenth aspect of the present invention and the function of each process of the tenth aspect with reference to FIGS. 4 and 5.

In the tenth aspect of the present invention, in a method for acquiring character resources of a printing system including storage means for storing character-resource information including the typeface name of all printable characters, the height/width of each character, the position of a base line, and character qualification setting parameters, and printing control means for controlling printing of a printer engine on a recording medium by analyzing a series of output control commands received from an external apparatus via a two-way interface, a first transfer step (step (2) shown in FIG. 4) of transferring a request to acquire character-resource information of all characters stored in the storage means to the printing apparatus, and a second transfer step (step (2) shown in FIG. 5) of transferring the character-resource information of all the characters stored in the storage means to the external apparatus at a time via the predetermined two-way interface in response to a request to acquire the character-resource information by first communication means are executed, so that processing of printing character information input to the external apparatus by the printing apparatus in an excellent state is performed by acquiring character-resource information of the printing apparatus, intending to perform printing, which originally must be stored in the external apparatus.

Second Embodiment

In the first embodiment, a description has been provided of a case in which all font-metrics information (character-resource information) is acquired from the printer 112.

In a second embodiment of the present invention, however, by loading font-metrics information and character-pattern-configuration data mounted in a printer into a host system, the same font is used both in the host system and the printer, so that a display output on a display of the host system coincides with a printing output by the printer. For that purpose, two-way communication control processing is performed by a printer control program (printer driver) stored in a program memory of the host system, and the printing apparatus (printer), and the same font is displayed on the display via a display control program (display driver).

According to this two-way communication control processing, the host system acquires various kinds of character-resource information relating to fonts mounted in the printer and character-pattern-configuration data (control information for generating a bit-map image of a font) for forming a font, and characters are printed by controlling the display and the printer based on the acquired information and data.

Since the configuration of the host system and the printer in the second embodiment is the same as that in the first embodiment shown in FIG. 1, description of the block diagram will be omitted.

According to the above-described configuration, the printer transmits character information comprising the attribute and pattern data, and the host system 100 stores the received information in the RAM 106 (or the disk device 103).

If the character-pattern-configuration data of the font from among the character-resource information and the character-pattern-configuration data stored in the RAM 106 (or the disk device 103) is the same as a font form (font format) which is recognizable in an operating system of the host system, that form may be used without modification. On the other hand, if the font format differs, the data is converted into a form which can be used in the operating system, and the coverted form is stored in a predetermined region of a storage device, such as the RAM 106, the disk device 103 or the like.

Processing of developing pattern data (rasterizing) is usually performed by a module called, for example, a font manager of the operating system. Although it is assumed in the present embodiment that the host system 100 and the printer 112 have character-pattern information in the form of pattern data called, for example, a vector font or a true-type font, loading of character-resource information and character-pattern-configuration data from the printer into the host system may also be performed even when a font is dealt with in the form of a bit map.

The printer control program performs the following processing in addition to the above-described loading of character-resource information and character-pattern-configuration data from the printer into the host system.

Character-code and character-printing-information input processing of inputting character-code data, the size of each character, the qualification attribute, the position to start printing, and the like in order to print a document with a font assigned by a document input program or the like stored in the RAM 106.

Input data and information analysis processing of analyzing character-code data and character-printing information input from the document input program or the like.

Printing-form control processing of determining a printing form of a configured document based on respective setting parameters indicating the size of each printed character, the qualification attribute, a printing form and the like, and information relating to a font mounted in the printer 112 and loaded into the host system in the above-described manner.

Output-control-command conversion processing of converting/generating printing control commands (described, for example, by a page description language or the like) for the printer 112 for printing a document having a determined printing form.

Output-control-command transmission control processing of transmitting generated printing control commands to the printer 112 so as to print a document with characters assigned by the printer 112.

Such processing is the same as that used in a known operating system, and therefore a detailed description thereof will be omitted.

Display Control Program (Display Driver)

Control processing and operations of the display control program (display driver) stored in the program RAM 6 within the host system will now be described in detail.

A character input program, such as a document formation application program of a word processor or the like, stored in the RAM 106 performs a predetermined output instruction when it is necessary to switch display on a picture surface in accordance with a change in the font or in the page to be displayed, a character input, or the like, whereby the display control program (display driver) stored in the RAM 106 is started.

The display control program (display driver) also peforms display initializing processing of the display 102 in order to control display output of the display 102.

A font is stored in the RAM 106 (or the disk device 103) in the form of a font format, which is recognizable in the operating system of the host system, by the display driver. The display driver performs display on the display 102 using this form. Thus, characters coincide between a printing output and display on the display 102.

In this case, the display driver performs the following processing.

Character code and character-display-output information input processing of inputting character-code data, the size of each character, the qualification attribute, the position to start printing, and the like in order to display a document on the display 102 with a font assigned by the document input program.

Input data and information analysis processing of analyzing character-code data, character-display-output information input and the like from the document input program.

Display-output-form control processing of determining a display output form of a configured document based on respective setting parameters for assigning the size of each character, the qualification attribute, a display output form, and the like, and character information loaded from the printer 112.

Output-pattern conversion processing of converting and generating a bit-map pattern in order to display a document having a determined output form, and output-transmission control processing of transmitting the generated bit-map pattern to the display 102 and displaying the document on the display 102.

As described above, since output to the display and output to the printer are performed after conversion into a bit map, the processing is substantially similar to the above-described processing of the printer driver.

Control at the Printer

A communication control program for performing two-way communication with the host system is stored in the program ROM 120 of the printer 112. This communication control program performs the following operations.

As described above, when a command to initialize the printer transmitted by control of the printer driver of the host system 100 has been received, initializing processing of the printer is performed. Thereafter, when an instruction to acquire information of the printer has been received, the communication control program of the printer 112 reads various kinds of character-resource information and font-pattern-configuration data relating to a font mounted in the printer 112 from the font ROM 119 (or the disk device 114), and transmits the read data to the host system 100 by performing two-way communication control processing with the host system 100. This character information is stored in the RAM 106 or the disk device 103 within the host system 100 in the above-described manner.

A control program for controlling character printing processing is stored in the program ROM 120 within the printer 112. This control program performs the following processing.

Printing-control-command input processsing of inputting printing control commands transmitted from the printer driver of the host system.

Control setting parameter analysis processing of analyzing printing control commands and various kinds of setting parameters which have been transmitted.

Bit-map development processing of developing a character pattern in a bit-map memory based on the printing control commands and the control setting parameters.

Processing of outputting and printing the bit map of developed characters to the printing-device driving system 122 via the input/output interface 116 provided in the engine control processing unit.

Operations

Next, processing of the printing apparatus and the display device performed in the printer control program (printer driver) stored in the program RAM 106 of the host system 100 and in the program ROM 120 within the printing apparatus (printer) 112 will be described in detail with reference to the flowcharts shown in FIGS. 6 through 10.

Figure 6:
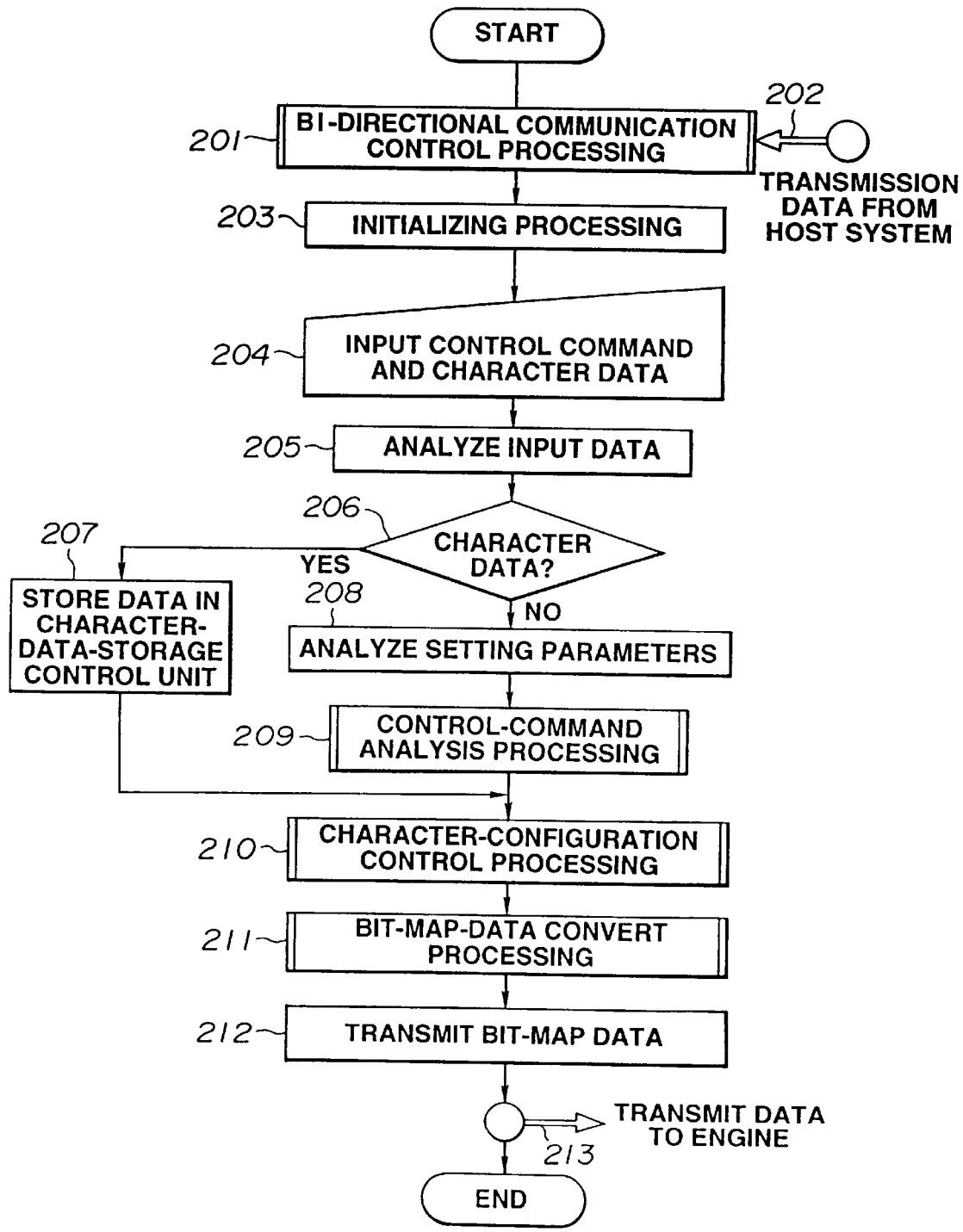
FIG. 6 is a flowchart illustrating processing of controlling two-way communication and control processing for printing characters stored in a program memory of the printer shown in FIG. 1 in a second embodiment of the present invention.

FIG. 6 is a flowchart illustrating printing control processing of the printer in the present embodiment.

Step 201 is a two-way communication control processing module, in which transmission/reception of data and input/output timings of respective signals are controlled using an input/output parallel interface method conforming to Centronix having a dedicated two-way communication protocol for performing communication with the host system 100, and signals, various kinds of instructions, data and the like from the host system 100 are received.

Step 203 indicates known initializing processing in order to prepare for printing by the printer. In this step, for example, setting of assigning a method of sheet feeding in the printer, assigning the size of output paper, providing fonts which can be printed is performed. In general, this step is performed upon reception of an initializing-control command from the host system 100 in step 201.

Step 204 is processing of inputting printing control commands and character-code data for printing characters from the host system 100. The input of the printing control commands and the character-code data is performed using a predetermined form, such as a page description language or the like, by the control of the printer driver stored in the program RAM 106 of the host system 100 based on an instruction of a document input program of a word processor or the like in the host system.

In step 205, processing of analyzing the printing control commands and the character-code data input from the host system in step 204 is performed.

In step 206, the analyzed data is separated into data of characters to be printed, and respective setting parameters.

In step 207, the character-code data separated in step 206 (branching by determination) is stored in a character-code-data storage control unit, such as the RAM 116 or the disk device 113, for the subsequent printing processing.

In step 208, the setting control parameters separated in step 206 (branching by determination) are analyzed. In step 209, control-command analysis processing (module) of determining a printing form of characters, comprising selection of the kind of characters, the printing attribute, calculation of the size of each character, the position of printing and the like, based on the analyzed setting parameters and printing control commands, and generating control data for printing characters.

In character-configuration control processing (module) in step 210, the configuration pattern and the form of characters, and arrangement of characters on pages of paper are determined based on the control data for printing characters analyzed and generated in step 208.

In bit-map development processing (module) in step 211, the configuration pattern and the form of characters determined in the character-configuration control processing (module) in step 210 are reproduced and generated in the form of bit-map data, and the bit-map data is developed in a page or printing-region (band) memory, such as the RAM 116 or the disk device 113.

In step 212, the bit-map data generated in step 211 is transmitted to the printing-device driving system 122, which prints characters based on the received bit-map data.

Figure 7:
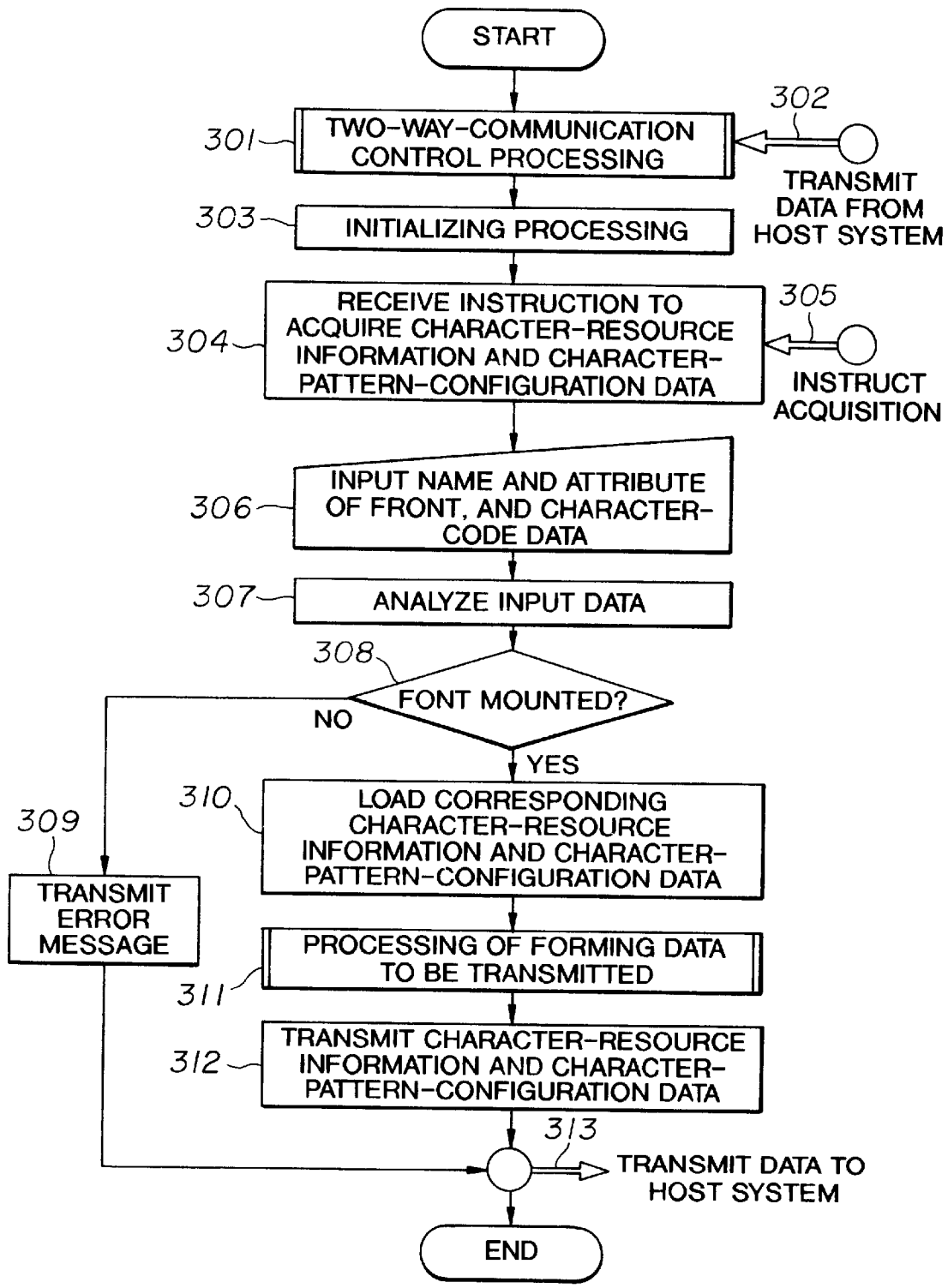
FIG. 7 is a flowchart illustrating processing of controlling two-way communication and control processing for transmitting character information to the host system stored in the program memory of the printer shown in FIG. 1 in the second embodiment.

FIG. 7 illustrates control processing of loading character-resource information and character-pattern data relating to a font mounted in the printer 112 into the host system 100 by the printer 112 in the present embodiment.

Step 301 is a two-way communication control processing module, in which in an input/output parallel interface coforming to Centronix having a dedicated two-way communication protocol for performing communication with the host system 100, processing of controlling transmission and reception of data, and providing input/output timings of respective signals is performed, and signals, various kinds of instructions and data, and the like from the host system 100 are received.

Step 303 is intializing processing for preparing for loading of various kinds of character-resource information relating to a font mounted in the printer 112 and character-pattern-configuration data for forming the font. This processing is performed by receiving a signal having a predetermined form, or an intializing control command described in a page description language or the like from the host system 100 (step 302).

In step 304, an instruction of acquisition (step 305) of the above-described information, i.e., various kinds of character-resource information relating to the font mounted in the printer 112 and character-pattern-configuration data for forming the font, is received. This information acquisition instruction is performed via the two-way communication control processing shown in step 301.

As shown in step 306, this information acquisition instruction from the host system 100 comprises control data relating to the name and the attribute of the font to be acquired by the host system 100, character-code data for determining the range of characters to be acquired, and the like. This control data is analyzed in step 307.

In step 308 (branching be determination), it is determined if a font which coincides with the name and the attribute of the font and the character-code data analyzed in step 307 is mounted in the printer 112.

If the result of the determination in step 308 is negative, an error message is transmitted to the host system 100 in step 309, and the error message is displayed on the display 102.

If the result of the determination in step 308 is affirmative, character information, i.e., various kinds of character-resource information and character-pattern-configuration data relating to the mounted font, is read from a storage device, such as the RAM 118 or the hard disk device 103 in the printer 112.

The read character-resource information and character-pattern-configuration data are arranged in a form provided for loading them in the host system 100 by a processing module of forming data to be transmitted in step 311, and the obtained data is transmitted to the host system 100 in step 312.

Figure 8:
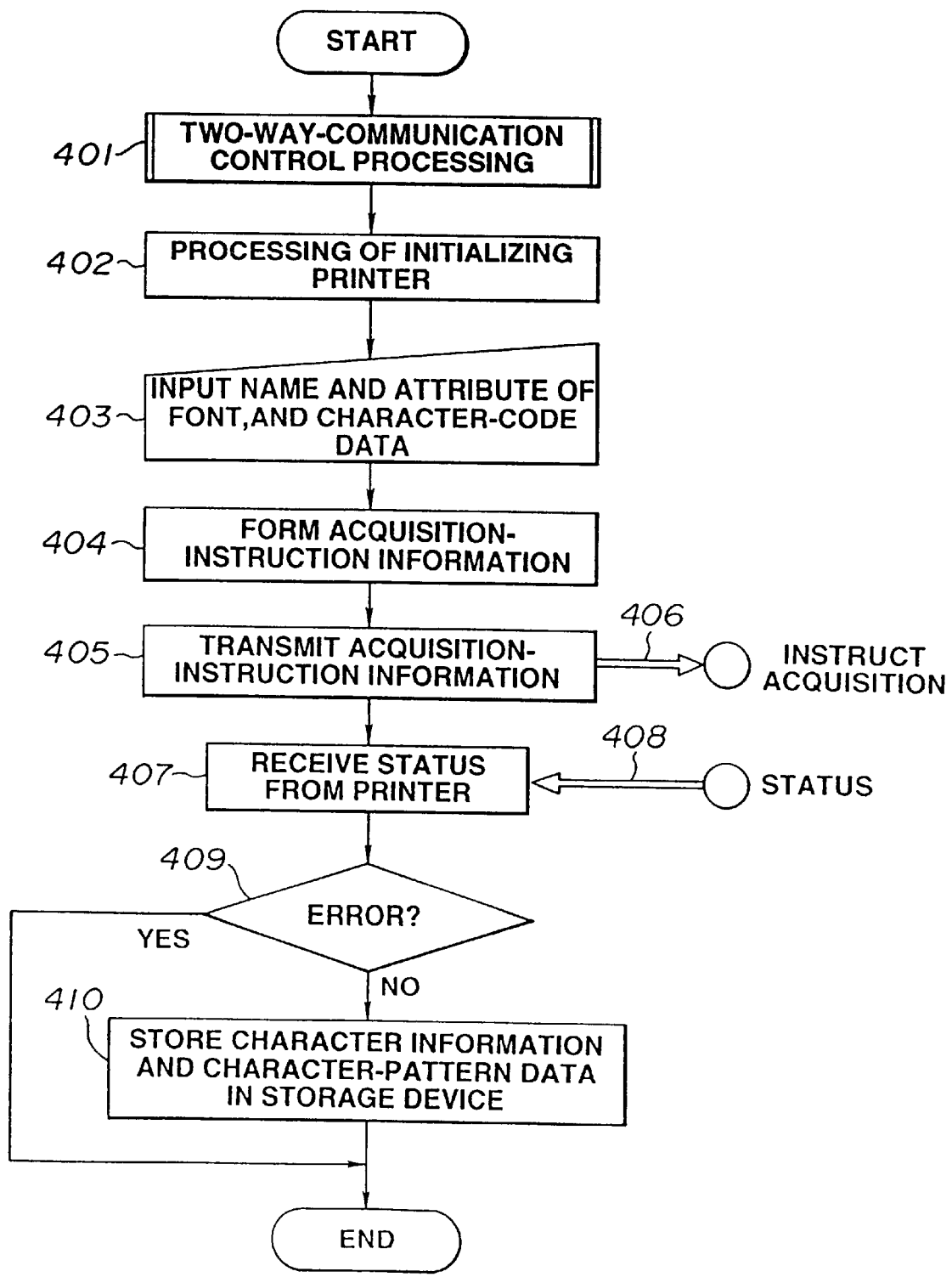
FIG. 8 is a flowchart illustrating processing of controlling two-way communication in a printer driver and control processing for acquiring character information from the printer stored in the program memory of the host system shown in FIG. 1 in the second embodiment.

FIG. 8 is a flowchart illustrating control processing of the printer control program (printer driver) stored in the program RAM 106 of the host system 100.

Step 401 indicates a two-way communication control processing module, in which processing of controlling transmission/reception of data via an input/output parallel interface conforming to Centronix having a dedicated two-way communication protocol for performing communication with the printer 110 is performed.

Step 402 is initializing processing for preparing for loading data in the printer 112 in order to acquire various kinds of character-resource information relating to a font mounted in the printer 112 and character-pattern-configuration data for forming the font, and is performed by transmitting a predetermined printer-initializing control command.

Step 403 is processing of inputting the name and the attribute of the font, character-code data for determining the range of characters to be acquired, and the like necessary for acquiring character-resource information and character-pattern-configuration data. Usually, when an application program, such as a word-processor program or the like, stored in the host system 100 requires information relating to a font for displaying characters, such information is transmitted to the printer driver. Step 403 indicates such processing.

In step 404, data of instruction of acquisition of font information and character-pattern data to be transmitted to the printer 112 is formed based on the information input in step 403. As described above, the data may be in the form of printer control commands, described in a page description language or the like, or in the form of a signal.

In step 405, the data formed in step 404 is transmitted to the printer 112 as an acquisition instruction 406. This acquisition instruction 406 corresponds to the acquisition instruction 305 shown in FIG. 7.

In step 407, a status 408 from the printer 112 is received.

In step 409, the response status message 408 indicating if a font corresponding to the acquisition instruction 406 is mounted in the printer 112 is determined. If the result of the determination in step 409 is negative, i.e., the corresponding font is not mounted and therefore the result indicates an error, the process is terminated.

If the result of the determination in step 409 is affirmative, i.e., the corresponding font is mounted, in step 410, various kinds of character-resource information relating to the font to be acquired and the character-pattern-configuration data for forming the font re received, and the received data is stored in a storage device, such as the RAM 106, the hard disk device 103 or the like.

As described above, it is possible to load the font mounted in the printer 112 from the printer 112 into the host system 100, and to store data relating to the font in a storage device, such as the RAM 106, the hard-disk device 103 or the like. This font can be rasterized in an appropriate manner so as to be used, for example, for display on the display 102 of the host system 100.

Figure 9:
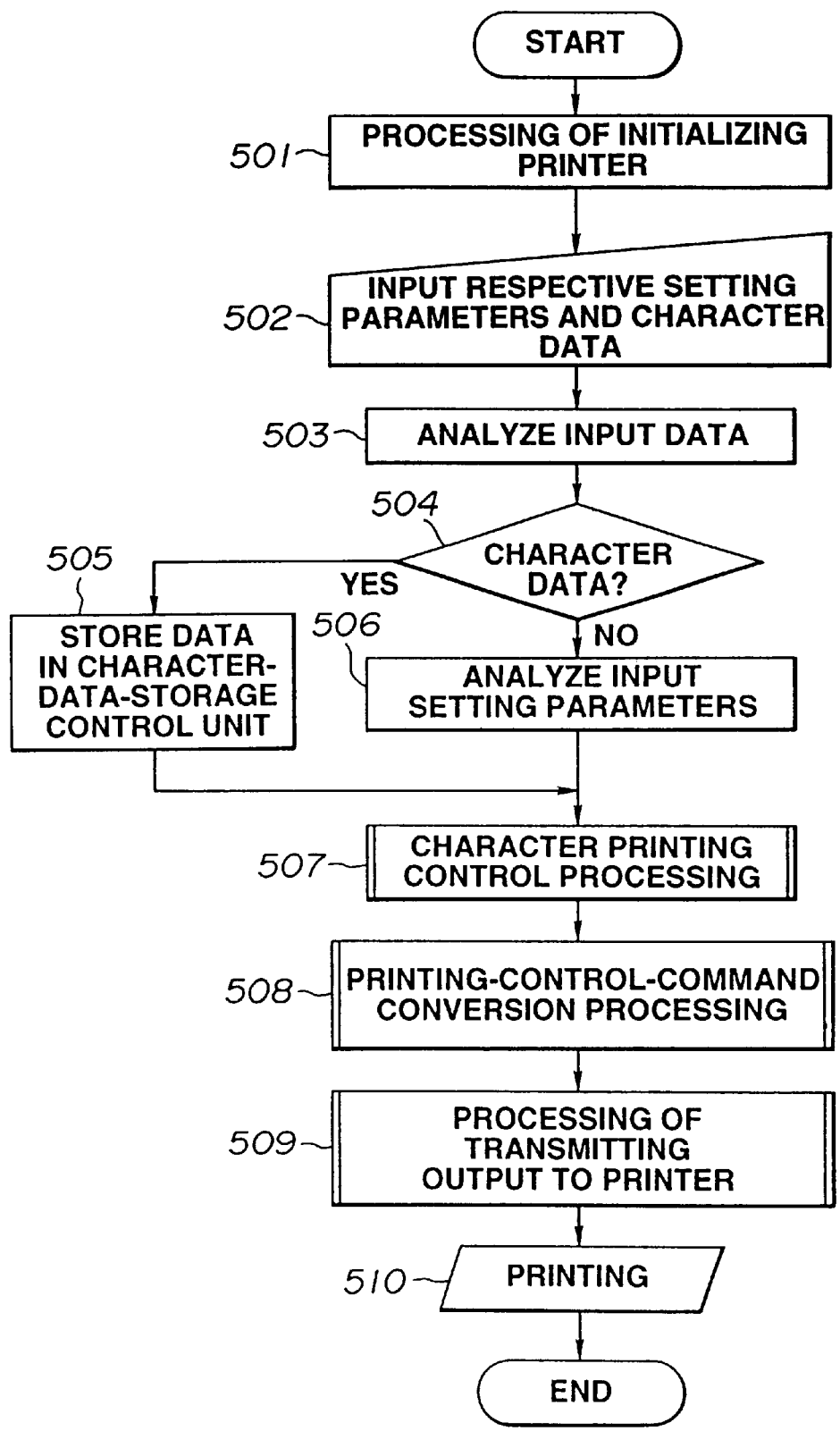
FIG. 9 is a flowchart illustrating printing control processing in the printer driver stored in the program memory of the host system shown in FIG. 1 in the second embodiment.

FIG. 9 is a flowchart illustrating processing performed by the printing control program (printer driver) stored in the RAM 106 of the host system 100 when actually printing characters.

The printing control program (printer driver) is started by a printing instruction from a document input program of an external apparatus (such as a word-processor application program stored in the host system 100, or the like).

First, in step 501, initializing processing of the printer is performed in which in order to provide preparation for a printing output, such as setting of the size of paper, the direction of printing, resolution of image scanning, units of the coordinate system, and the like, respective setting parameters for the printer are converted and generated into printer control commands, and the generated commands are transmitted.

In step 502, respective setting parameters for assigning a printing form of characters of a document from the outside, and character-code data are input to the printer driver. In general, these data are input from an application program for forming a document directly or via an operating system.

In step 503, processing of analyzing the respective setting parameters and character-code data which have been input is performed.

The parameters and data analyzed in step 503 are separated into character-code data and respective setting parameters in step 504.

The character-code data separated in step 504 (branching by determination) is stored in the character-data storage control unit in step 505, and is prepared for the subsequent processing.

The input setting parameters separated in step 504 (branching by determination) are analyzed in step 506.

In character printing control processing (module) in step 507, a printing form of characters, comprising selection of the kind of characters, the printing attribute, calculation of the size of each character, the position of printing, and the like, is determined based on the input-setting-parameter analysis processing in step 506. The character-code data stored in the character-data storage control unit in step 505 is arranged in a data buffer corresponding to pages of output paper of the printer in accordance with this printing form.

Control data of characters formed in step 507 is converted/generated into printing control commands for the printer in order to print the characters by the printer in printing-control-command conversion processsing (module) in step 508.

In processing (module) of transmitting an output to the printer in step 509, the printing control commands generated in step 508 are transmitted to the printer 112. In step 510, actual printing by the printer 112 is performed. Usually, the printer has a function of rasterizing the mounted font in the form of a bit map. Hence, processing of developing data of the font into a bit map and transmitting the bit map to the printer is not performed, but printing control commands for assigning a font are transmitted.

A description will now be provided of display control with referance to FIG. 9. The control processing in steps 502–506 shown in FIG. 9 is entirely the same as processing performed when the display control program (display driver) stored in the program RAM 106 of the host system. 100 performs display on the display 102 of the host system 100.

However, the subsequent processing differs in the display control. In the display driver, in the position of step 507 shown in FIG. 9, character-pattern-configuration data (control data describing the font) is developed into a bit-map pattern by being rasterized, and is transmitted to the display 102 as a luminance signal to be displayed thereon.

Figure 10:
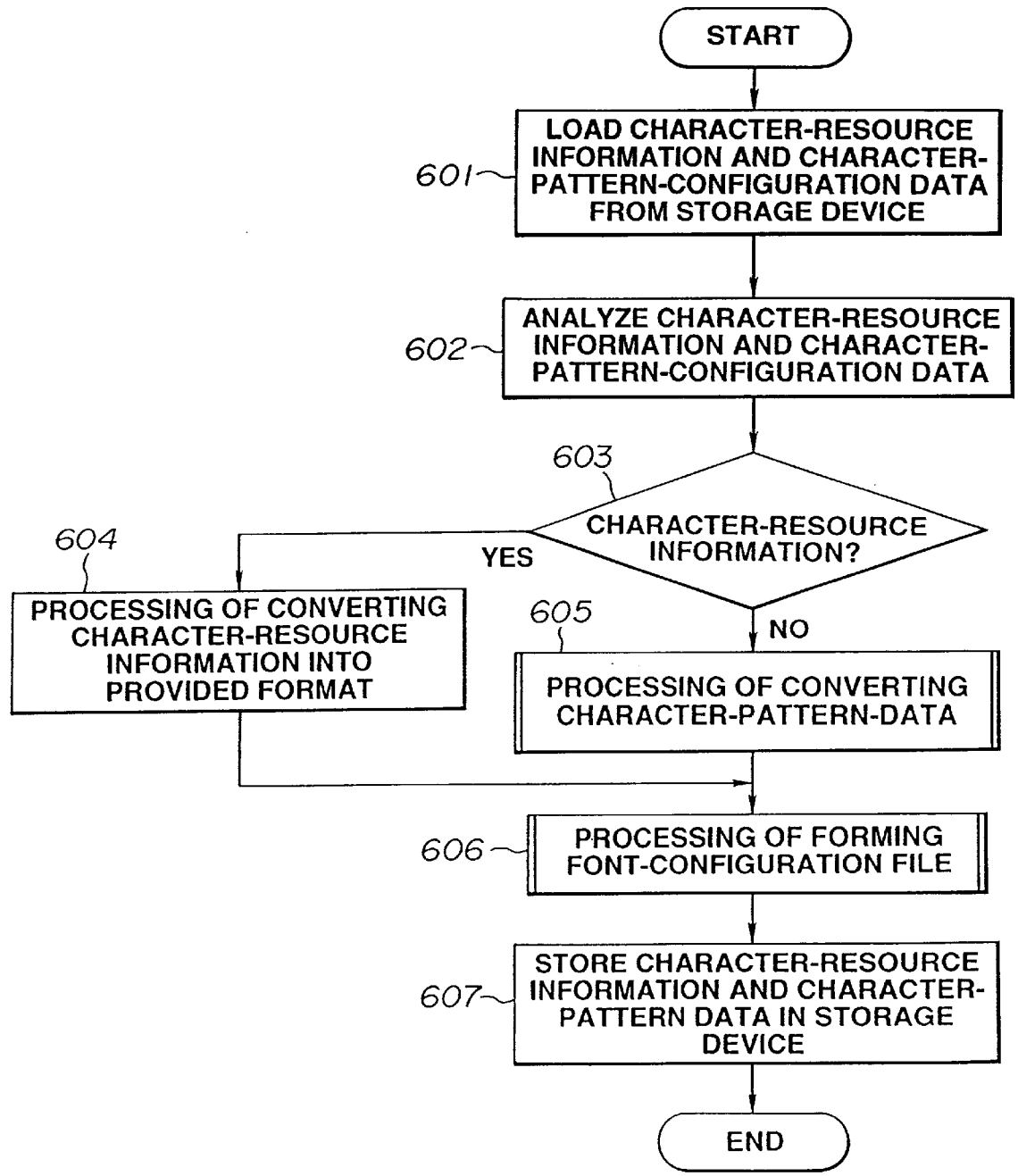
FIG. 10 is a flowchart illustrating character-information conversion processing and control processing for performing a rasterizing operation in the host system shown in FIG. 1 in the second embodiment.

FIG. 10 illustrates processing performed by the display driver in which character-pattern-configuration data (control data describing the font) loaded from the printer 112 is converted into a font form capable of generally being used in an operating system being used, or into a bit-map form so as to be able to be transmitted to and displayed on the display 102 by rasterizing the data.

In step 601, the character-resource information and the character-pattern-configuration data loaded from the printer 112 and stored in a storage device, such as the RAM 106 of the host system 100, the hard-disk device 103 or the like, in the above-described manner are loaded in operation regions of the RAM 106.

In step 602, the character-resource information and the character-pattern-configuration data loaded in step 601 are analyzed.

Various forms are known as forms for describing a font. In step 602, the form of the character-resource information and the character-pattern-configuration data loaded from the printer 112 is specified. In addition, it is determined if the data can be converted by processing which will be described later.

The information and data analyzed in step 602 are separated into various kinds of character-resource information relating to the font and character-pattern-configuration data describing the font in step 603 (branching by determination).

The character-resource information separated in step 603 (branching by determination) is converted, in step 604, into an information form (format) provided so as to be recognizable by an operating system of the host system 100, and is prepared for the subsequent processing.

The character-pattern-configuration data separated in step 603 (branching by determination) is rasterized with a provided format so as to be recognizable by the operating system in a character-pattern-data development processing module in step 605.

In this rasterizing processing, the character-pattern-configuration data comprises, in a so-called vector font or the like, the start point, the end point, the inflection point and the like of each component (picture) constituting a character. For example, if the standard form of the operating system comprises the form of a bit-map font, the character-pattern-configuration data is converted into the form of a bit-map image.

When the loaded character-pattern-configuration data and the standard font form of the operating system belong to a font of the same type (for example, a vector font), but have different description methods, necessary conversion processing may be performed in this step 605.

When using Microsoft Window (a registered trademark) as the operating system of the host system, a True Type font (a registered trademark) format, a WIFE font (a registered trademark), and the like are known as standard font formats for the system.

In step 606, a file of fonts recognizable by the operating system is formed based on the character-resource information converted into the provided standard format of the operating system, and the rasterized character-pattern data obtained in steps 604 and 605, respectively.

This file is described in such a form that the display driver can utilize it using, for example, a module called a font manager or a font driver of the operating system when performing display control by receiving font assignment by an application of a word processor or the like using a standard application interface.

In step 607, the font file formed in step 606 is also stored in a storage device, such as the RAM 106 of the host system 100, or the hard-disk device 103.

According to the above-described embodiment, the printer driver for controlling the printer stored in the program memory of the host system transmits an instruction notification for acquiring various kinds of character-resource information relating to a font mounted in the printer (information for setting the name and the style of the font, and the like, attribute information, relating to the pitch of characters, components constituting each character, and the like) and character-pattern-configuration data for forming the font to the printer using a two-way communication protocol between the host system and the printer. The printer which has received the acquisition instruction notification loads the character-resource information and the character-pattern-configuration data into the host system (see FIGS. 7 and 8).

The printer driver in the host system, which has acquired the above-described information and data performs format conversion and rasterizing processing so that the font can be recognized in the operating system.

Thus, when a font constituting a document has been selected from a document input program in an external apparatus, and updating of display of a document or instruction of printing has been performed, display can be performed utilizing the loaded font. When it is intended to print a document, by transmitting font-assigning information and charater codes to the printer, characters can be printed at a high speed using the font incorporated in the printer (see FIGS. 6 and 9).

That is, since the font mounted in the printer is utilized, coincidence between a document displayed on the display and a document printed by the printer can be realized.

According to the present embodiment, since a bit-map image is not transmitted in every printing operation, throughput between the host system and the printer during printing is improved, and therefore high-speed printing can be performed.

Furthermore, since the conventional approach of loading character information from the host system to the printer is not adopted, the printer need not have a large-capacity RAM, or other large-capacity storage device, such as a hard-disk device or the like.

Since it is unnessary to mount the same font both in the host system and the printer, a storage region is not wastefully used. Furthermore, since an approach of utilizing a font loaded from the printer commonly in the host system is adopted, it is very easy to maintain compatibility of a font between the host system and the printer.

That is, according to the present embodiment, all the problems to be solved in the present invention can be solved.

Although in the above-described embodiment, an input/output parallel interface conforming to Centronix has been illustrated as an interface method between the host system 100 and the printer 112, any other interface method may also be used provided that a two-way communication protocol can be used. For example, in addition to a parallel interface conforming to Centronix, a serial interface conforming to RS-422 or the like, or an SCSI interface may be used. Alternatively, the printer may be directly connected to an expanded bus of the CPU of the host system.

In another approach, the printer driver of the host system 100 may directly access the ROM 119 or the disk device 114 of the printer 112 so as to acquire only information necessary for display processing of the host system, and the like from among various kinds of character-resource information (attribute information, such as the name of the style of a font, the pitch of characters, components constituting each character, and the like) and character-pattern-configuration data for forming the font.

Although a description has been provided of a case in which the printer driver or the display driver constituting the operating system performs processing of loading a font from the printer and developing the font, a configuration may also be considered in which a module performing processing of loading a font from the printer and developing the font is prepared as an application program executed in the operating system. In such a configuration, the application program is executed by instructing loading of the font from the printer and development of the font from the user whenever necessary. Accordingly, the font of the printer 112 can be utilized, for example, as an optional display font.

The module performing processing of loading a font from the printer and developing the font may also be prepared as a resident driver or an application program (for example, a loadable module called a device driver, TSR or the like in an operating system, such as MSDOS (registered trade mark) or the like).

Although a description has been provided of a case of controlling display utilizing character information loaded from the printer into the host system, the host system may utilize character-resource information and character-pattern-configuration data, which have been loaded, for other control than display control. For example, the above-described information and data loaded from the printer into the host system may also be utilized when rasterizing a document formed by a word processor into image information which can be transmitted through facsimile.

The individual components designated by blocks in the drawings are all well known in the printing appratus and printing system arts and their specific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A printing system consisting of a printer and a printer driver for analyzing character data and a parameter to be input from an application and for formulating and outputting a printing output control command to said printer, said system comprising:

transmission means for transmitting an instruction to said printer to acquire font information;

reception means for receiving the font information transmitted by the printer in response to the instruction to acquire the font information;

formulating means for determining a printing form including printing positions of the character data to be input from the application based on the font information received by said reception means, and formulating a printing output control command based on that determination; and outputting means for outputting the printing output control command formulated by said formulating means to the printer.

2. A printing system according to claim 1, wherein said font information includes font-metric information.

3. A printing system according to claim 1, wherein said font information includes font-metric information and character pattern data.

4. A printing system according to claim 1, further comprising conversion means for converting the font information received by said reception means into a form recognizable by an operating system.

5. A method of formulating and outputting a printing output control command of a printer driver for analyzing character data and a parameter to be input from an application, said method comprising:

a transmission step of transmitting an instruction to a printer to acquire font information;

a reception step of receiving the font information transmitted by the printer in response to the instruction to acquire the font information;

a formulating step of determining a printing form including printing position of character data to be input from an application based on the font information received in said reception step, and formulating a printing output control command based on that determination; and an outputting step of outputting the printing output control command formulated in said formulating step to the printer.

6. A method according to claim 5, wherein the font information includes font-metric information.

7. A method according to claim 5, wherein the font information includes font-metric information and character pattern data.

8. A method according to claim 5, further comprising a conversion step of converting the font information received in said reception step into a form recognizable by an operating system.

9. A printer driver program product for instructing a computer to perform a method for analyzing character data and a parameter to be input from an application and for formulating and outputting a printing output control command to a printer, the method comprising:

a transmission step of transmitting an instruction to the printer to acquire font information;

a reception step of receiving the font information transmitted by the printer in response to the instruction to acquire the font information;

a formulating step of determining a printing form including printing positions of character data to be input from the application based on the font information received in said reception step and formulating a printing output control command based on that determination; and an outputting step of outputting the printing output control command formulated in said formulating step to the printer.

10. A printer driver program product according claim 9, wherein the font information includes font-metric information.

11. A printer driver program product according to claim 9, wherein the font information includes font-metric information and character pattern data.

12. A printer driver program product according to claim 9, further comprising a conversion step of converting the font information received in said reception step into a form recognizable by an operating system.

13. A storage medium storing a printer driver for analyzing character data and a parameter to be input from an application and for formulating and outputting a printing output control command to a printer, said printer driver controlling a method comprising:

a transmission step of transmitting an instruction to the printer to acquire font information;

a reception step of receiving the font information transmitted by the printer in response to the instruction to acquire the font information;

a formulating step of determining a printing form including printing positions of the character data to be input from the application based on the font information received in said reception step, and formulating a printing output control command based on that determination; and an outputting step of outputting the printing output control command formulated in said formulating step to the printer.

14. A storage medium according to claim 13, wherein the font information includes font-metric information.

15. A storage medium according to claim 13, wherein the font information includes font-metric information and character patter data.

16. A storage medium according to claim 13, further comprising a conversion step of converting the font information received in said reception step into a form recognizable by an operating system.

* * * * *

UNITED STATES PATENT AND TRADEMARK OFFICE
CERTIFICATE OF CORRECTION

PATENT NO. : 6,388,757 B1
DATED : May 14, 2002
INVENTOR(S) : Koga

It is certified that error appears in the above-identified patent and that said Letters Patent is hereby corrected as shown below:

<u>Drawings,</u>
Sheet 7, Figure 7, "FRONT" should read -- FONT --.

<u>Column 5,</u>
Line 15, "form." should read -- form --.

<u>Column 6,</u>
Line 36, "invent-ion," should read -- invention, --.

<u>Column 8,</u>
Line 33, "font-matrix" should read -- font-metrics --.

<u>Column 10,</u>
Line 24, "font-matrix" should read -- font-metrics --.

<u>Column 15,</u>
Line 43, "acquisition" should read -- acquisition instruction --.

<u>Column 17,</u>
Line 16, "confntrol" should read -- control --.

<u>Column 22,</u>
Line 25, "be" should read -- by --.

<u>Column 23,</u>
Line 22, "re" should be deleted.

Signed and Sealed this

Fourteenth Day of January, 2003

JAMES E. ROGAN
*Director of the United States Patent and Trademark Office*